United States Patent [19]

Austin

[11] Patent Number: 4,834,131
[45] Date of Patent: May 30, 1989

[54] SAFETY SYSTEM FOR PNEUMATIC TOOLS

[75] Inventor: Ronald Austin, Hazelcrest, Ill.

[73] Assignee: Duo-Fast Corporation, Franklin Park, Ill.

[21] Appl. No.: 119,178

[22] Filed: Nov. 10, 1987

[51] Int. Cl.$^4$ .............................................. F16K 17/04
[52] U.S. Cl. .................... 137/115; 137/541; 173/169; 251/900
[58] Field of Search .................. 91/452, 468; 137/115, 137/541; 173/168, 169; 251/900

[56] References Cited

U.S. PATENT DOCUMENTS

| | | | |
|---|---|---|---|
| 2,233,163 | 2/1941 | Fosnot | 173/169 |
| 2,607,559 | 8/1952 | Forss | 173/169 X |
| 2,639,102 | 5/1953 | Ball | 137/115 X |
| 2,713,989 | 7/1955 | Bryant | 251/900 |
| 3,067,770 | 12/1962 | Fancher | 137/541 X |
| 3,451,416 | 6/1969 | Nyberg | 137/115 X |
| 3,545,887 | 12/1970 | Kobnick | 137/115 X |
| 4,273,151 | 6/1981 | Nezworski | 137/115 |
| 4,441,629 | 4/1984 | Mackal | 137/115 X |

*Primary Examiner*—Robert G. Nilson
*Attorney, Agent, or Firm*—Mason, Kolehmainen, Rathburn & Wyss

[57] ABSTRACT

A safety system for automatically preventing over pressure in the interior of a pneumatically operated tool supplied from a source of compressed air includes a safety relief valve detachably connected between the tool and the compressed air source. The safety valve includes a hollow housing having a relief port therein and a resettable valve member is mounted in the housing and movable to open and close the relief port in response to the level of air pressure supplied from the source of compressed air. The housing includes an access opening opposite the relief port and a removable stop member is provided to normally close the access opening and limit the movement of the valve member in a direction inwardly of the housing. The access opening is dimensioned to permit easy insertion and removal of the valve member into and out of the housing. A biasing spring is mounted on the valve member for maintaining an inner end of the member in engagement with the stop until an over pressure is encountered and when this occurs, the excessive air pressure becomes effective to move the valve member outwardly to open the relief port. Once the over pressure no longer obtains, the biasing spring is again effective to reseat the valve and close the relief port so that tool operation may be continued.

25 Claims, 3 Drawing Sheets

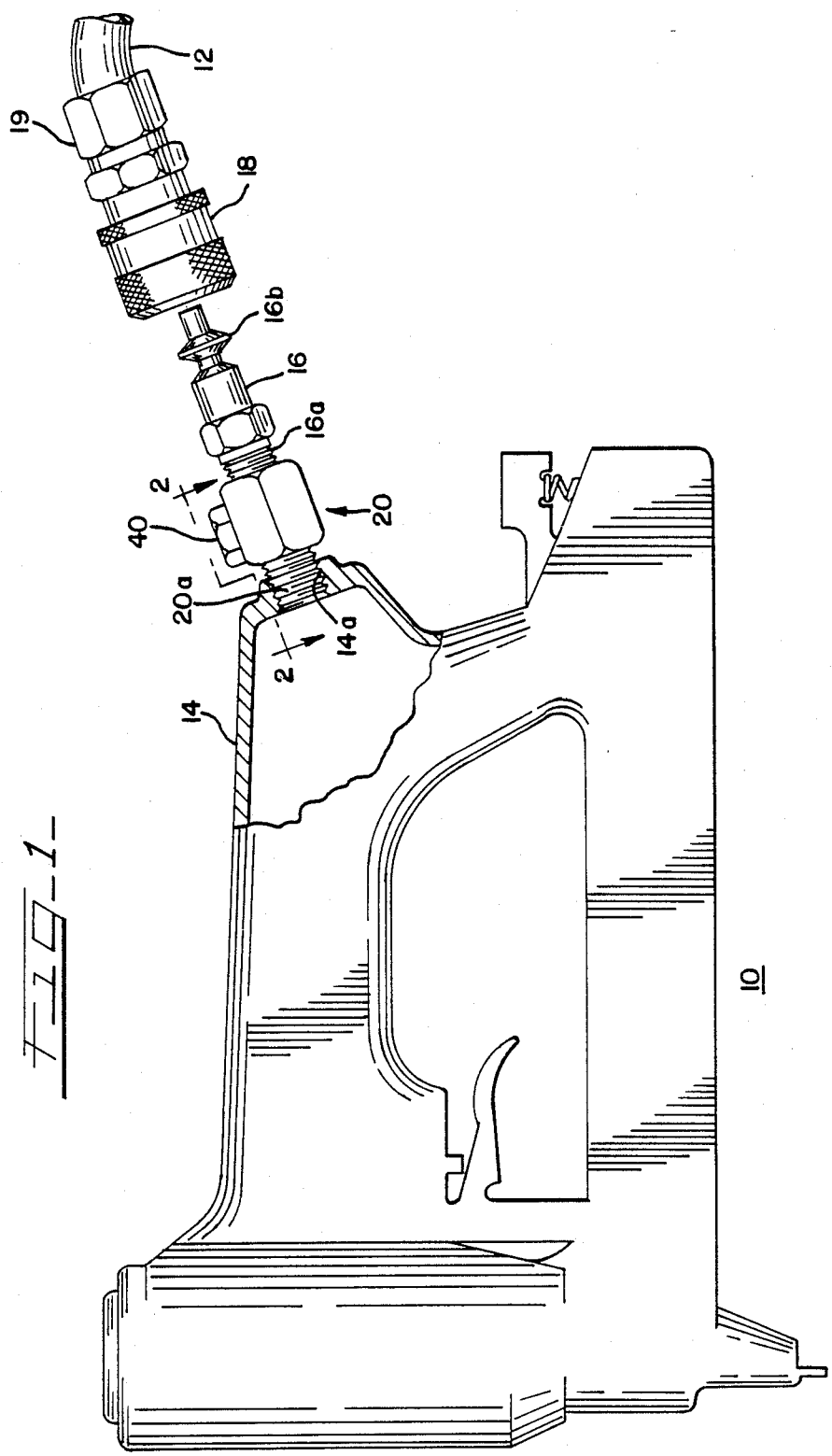

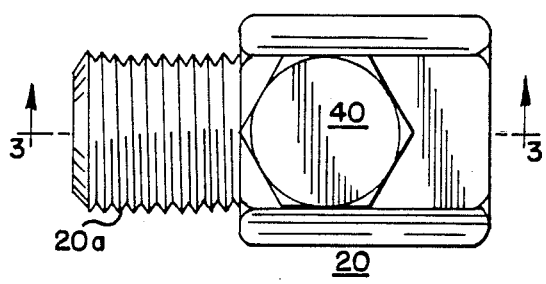
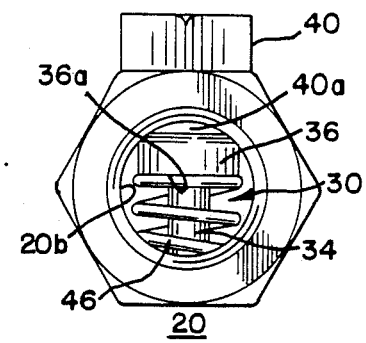
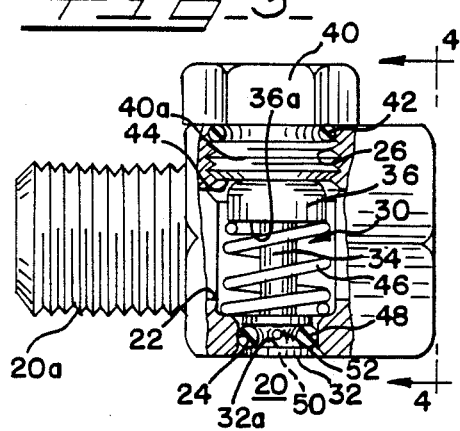
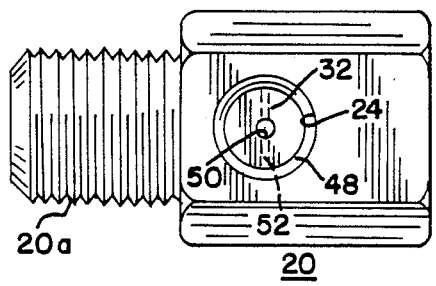
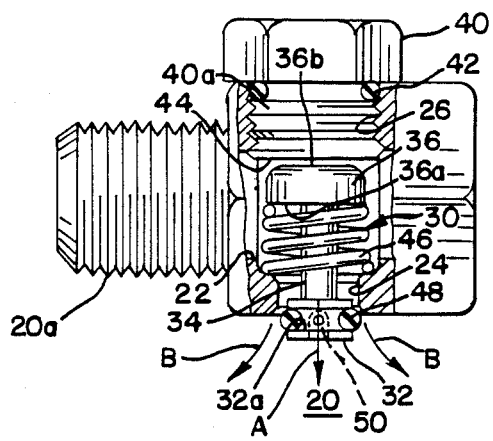

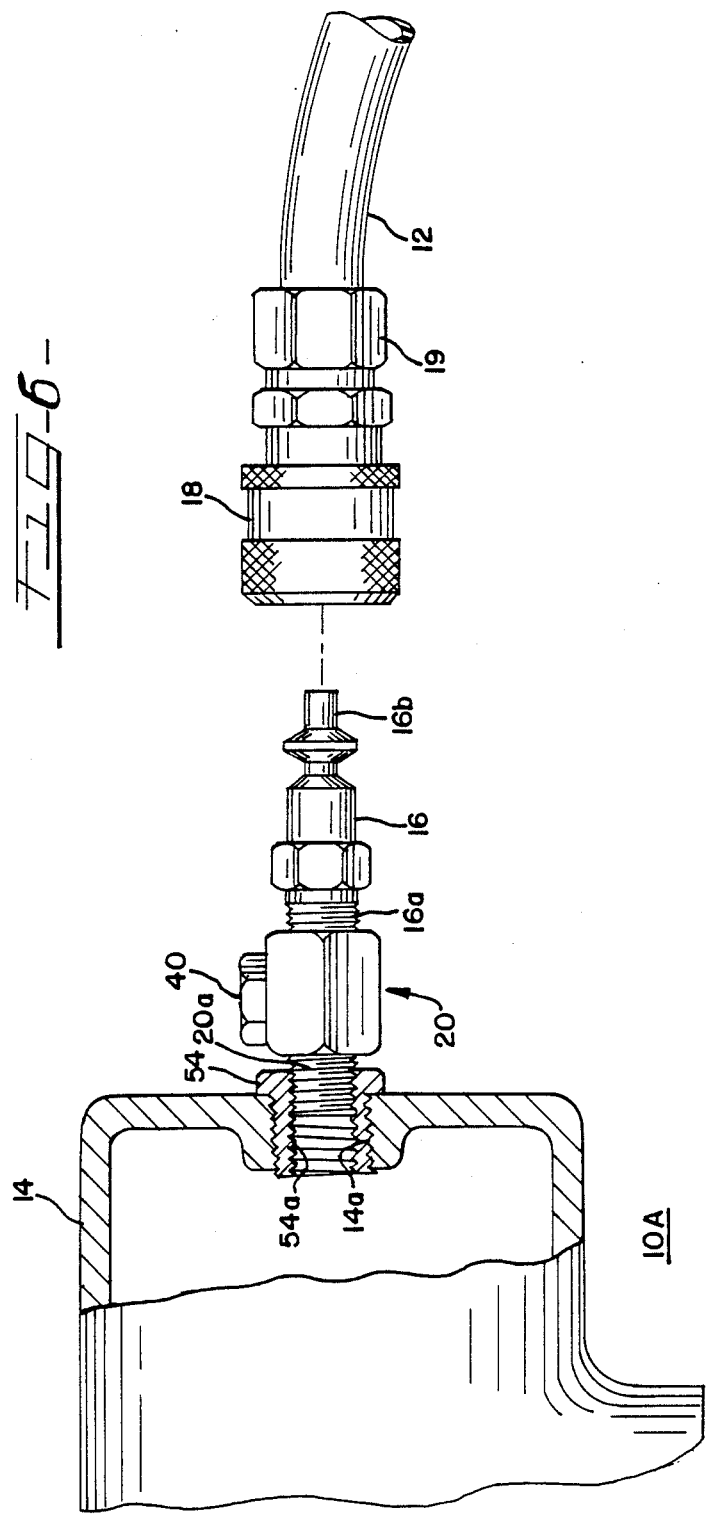

SAFETY SYSTEM FOR PNEUMATIC TOOLS

BACKGROUND OF THE INVENTION

1. Field of the Invention

The present invention relates to a new and improved safety system for automatically preventing over pressure in the interior of pneumatically operated devices such as air tools and the like which are supplied from a source of compressed air. Many such tools and pneumatically operated devices have interior air chambers and in particular, fastener driving tools employ hollow handles having an air chamber therein for supplying compressed air to operate the mechanism within the tool body. The present invention is directed towards a safety relief valve system for preventing injury to persons and the surrounding environment in the event that an over pressure or excessively high pressure is inadvertently supplied to the tool. The safety system is automatically resettable so that when the air pressure is reduced back to an acceptable safe level, tool operation may then be continued.

2. Background of the Prior Art

In the past, pneumatic tools and particularly, fastener driving tools have employed blowout plugs in the handle or internal reservoirs thereof so that the inadvertent connection of the tool to a source of compressed air of excessive pressure does not result in explosion or fracture of the tool body or housing and other damage to tee tool, the surrounding environment and operating personnel. However, after a blowout plug is expelled because of excessive pressure, sometimes lengthy servicing of the tool is required before the tool can be put back on the line for continuing operation.

German Patent No. 24 22 223 discloses a compressed air tool having a vent valve therein to protect against back pressure caused by the operating piston moving in the working cylinder. British patent application No. 2,124,537 discloses a pneumatic nailer in which disablement of tool operation occurs when a predetermined main pressure is exceeded. Belgian Patent No. 527,617 discloses a fluid relief valve and the following U.S. Pat. Nos. 1,454,409; 2,530,091; 2,845,085 and 3,542,062 disclose various pressure relief valves and pressure relief systems.

None of the prior art patents provide an automatically resetting safety system for pneumatic tools and the like capable of protecting the tool, environment and personnel from possible damage should the tool be inadvertently connected to a supply of pressurized air at excessive pressure exceeding the design or safe operating pressure of the tool.

OBJECTS OF THE INVENTION

It is therefore an object of the present invention to provide a new and improved safety system for pneumatic tools of the character described and more particularly, a new and improved safety relief valve which can be retrofitted into a system of existing pneumatic tools presently in use.

Yet another object of the present invention is to provide a new and improved safety relief valve which is automatically reset when the pressure of the air supplied to the tool is reduced back to an acceptable safe level.

Still another object of the present invention is to provide a new and improved safety relief valve of the character described which is universal in nature and can be attached to a wide variety of existing pneumatic tools new and old without interfering with the normal operation thereof.

Another object of the present invention is to provide a new and improved safety relief valve of the character described which is relatively low in cost, small in size and extremely reliable and durable in operation over a long period of time without requiring service or attention.

BRIEF SUMMARY OF THE INVENTION

In accordance with the foregoing and other objects and advantages of the present invention, there is provided a new and improved safety valve for interconnection between a pneumatic tool and a source of compressed air used for operating the tool. The safety relief valve includes a hollow body having detachable connectors at opposite ends and an access port on one side aligned coaxially with a relief port on an opposite side and spaced between the end connectors. A valve assembly is insertable into the hollow body through the access port along a central axis thereof extending transversely across a fluid path in the valve body extending between the opposite end connectors.

The valve assembly includes a valve disk forming an outer end portion adapted to open and close the relief port and a stop disk at an opposite inside end interconnected with a stem. A removable stop member is provided normally closing the access port and includes a stop surface engageable with the stop disk for limiting the travel of the valve element in a direction inwardly of the relief port. A biasing spring is mounted on the stem and engaged between the stop disk at one end and an interior surface of the body around the relief port. The spring provides a biasing force urging the valve disk to close the relief port until such time as the internal air pressure with- in the valve body acting against the biasing spring reaches a predetermined maximum safe level and thereafter opens the valve disk to vent the excess pressure from the valve body out through the relief port. When the internal pressure in the body is reduced to the selected safe level, the biasing spring becomes effective to reset and close the valve disk in the relief port so that operation of the tool at a safe pressure may continue.

BRIEF DESCRIPTION OF THE DRAWINGS

A better understanding of the present invention is provided by reference to the following detailed description taken in conjunction with the drawings, in which:

FIG. 1 is an elevational view (with a portion broken away and in section) illustrating a new and improved safety system for pneumatic tools constructed in accordance with the features of the present invention;

FIG. 2 is a top plan view of a safety relief valve constructed in accordance with the features of the present invention;

FIG. 3 is a longitudinal cross-sectional view of the valve of FIG. 2 taken substantially along lines 3—3;

FIG. 3A is a longitudinal cross-sectional view of the valve similar to FIG. 3 but illustrating the internal relief valve assembly in a venting position for venting over pressure whenever the tool is connected to a source of compressed air having an unsafe high pressure level;

FIG. 4 is an end view of the valve taken substantially along lines 4—4 of FIG. 3;

FIG. 5 is a bottom view of the safety relief valve; and

FIG. 6 is a fragmentary plan view of a safety system in accordance with the present invention employed with a relatively large, pneumatic tool.

DETAILED DESCRIPTION OF A PREFERRED EMBODIMENT

Referring now more particularly to the drawings, therein is illustrated a typical pneumatic tool such as a hand-held, relatively small and lightweight fastener driving tool 10 designed to be operated by compressed air supplied from a suitable source such as a portable tank, manifold system or air compressor (not shown) through a flexible supply hose 12. Typically, such tools 10 are designed for operation at a maximum safe operating pressure of 120 psi and have a hollow handle 14 serving as an air chamber or reservoir for the immediate supply of compressed air to operate the internal driving mechanism of the tool.

The body of the tool is generally formed of cast metal and/or plastic and is tested under quality control procedure to withstand internal air pressures of up to about 360 psi. This pressure is well above the normal operational pressure that is preferred for the continuous safe operation of the tool of approximately 100 psi. Accidents may occur with pneumatic tools and other devices of the type shown when inadvertently the tool is connected to a source of compressed fluid at a pressure, for example 500-1000 psi or greater. These excessive pressures have been sufficient to cause a tool body to fail, shatter or explode and thereby cause injury to the person and the environmental vicinity. Such accidents have occurred when a tool was inadvertently connected to a source of high pressure bottled fluid such as oxygen at a remote job site, however, in manufacturing plants having several sources of high pressure compressed air it is not out of the realm of possibility for operating personnel to connect the tool to the wrong source rather than the proper low pressure air supply manifold.

Normally, small size hand tools 10 are supplied with a fitting 16 having a male threaded portion 16a adapted to be threaded into a threaded aperture 14a provided in the rear end of the hollow handle 14. At the outer end the fitting is provided with an end connector 16b especially adapted for connection to a quick disconnect type, connector sleeve 18 attached on an end fitting 19 of the flexible supply line 12. The quick disconnect sleeve can be rapidly detached from the end portion 16b, and when disconnected, a valve within the sleeve automatically closes to prevent the escape of compressed air from the line.

In accordance with the present invention, a safety release system includes a relief valve 20 especially designed and adapted for interconnection between the pneumatic tool 10 and the air supply fitting 16. The safety relief valve 20 includes a tubular, hollow body formed with an outer surface including hexagonal flats around an outer end portion remote from an opposite, male threaded end portion 20a adapted to be threaded directly into the threaded aperture 14a of the hollow tool handle 14 after removal of the fitting 16 from the tool. At the opposite end, in coaxial alignment with the male threaded end, the valve body is formed with an internal female threaded opening 20b adapted to receive the male threaded end portion 16a of the fitting 16.

In order to install the safety release valve 20 in accordance with the invention, the fitting 16 is simply unthreaded from the handle 14 of the tool 10 and the threaded male end portion 20a of the relief valve 20 is inserted into the threaded aperture 14a. The removed fitting 16 is then threadedly attached to the body of the release valve 20 by threading the male section 16a into the female threaded end portion 20b. The quick disconnect sleeve 18 is then again operable to provide a rapid disconnect between the tool and a source of compressed air when desired.

In accordance with the present invention, the relief valve body includes a generally cylindrical bore 22 extending longitudinally between the coaxially aligned threaded male end portion 20a and the internally threaded female end portion 20b. The bore is intersected at right angles by a generally cylindrical, relief port 24 formed to intersect one of the outer flat sides of the valve body at right angles thereto. On an opposite flat there is formed an internally threaded access opening 26 of slightly larger diameter so as to enable a relief valve assembly 30 to be bodily inserted into the interior of the valve body in a transverse direction. The access port also provides a convenient means for removal and replacement of the valve assembly from time to time as desired or necessary.

The relief valve assembly includes a valve member having a generally cylindrical valve disk 32 adjacent an outer end dimensioned and adapted to open and close the relief port 24. The valve disk is connected to an elongated stem 34 of reduced diameter extending transversely inwardly into the valve body on an axis at right angles to the longitudinal axis of the bore 22. The relief port 24 and the access opening 26 as shown in FIGS. 3 and 3A are in coaxial alignment and the inner end of the stem 34 is formed with a button-like, stop disk 36 also of generally cylindrical shape and having an outer diameter slightly larger than the inside diameter of the cylindrical relief port 24. The larger diameter of the stop disk 36 prevents the valve assembly 30 from being expelled out of the valve body through the relief port 24. The diameter of the stop disk is somewhat less than the internal diameter of the access opening 26 however, in order to permit the entire valve assembly 30 to be bodily inserted into and/or removed from the interior of the valve body through the access opening when open.

Normally the access port is closed by a cap screw-like stop member 40 having a hexagonal-shaped outer head and a threaded shank 40a that is threadedly engaged in the threaded access opening 26. An "O" ring seal 42 is provided to establish a tight seal between an inner radial surface of the hex head and the adjacent inside surface of the access opening 26 when the stop member is fully seated and tightened as shown in FIGS. 3 and 3A. At the inner end of the shank 40a, the stop member is provided with a flat, radial, circular-shaped stop surface 44 adapted to engage an opposing face 36b of the stop disk 36 of the valve assembly when the valve disk 24 is in a fully closed position seated in the relief port 24 as shown in FIGS. 3 and 5.

The valve disk 32 is biased toward a relief port closing position as shown in FIG. 3 by a coil spring 46 mounted in coaxial alignment on the stem 34 between the disks 32 and 36. An outer end coil of the spring is seated against an annular surface on the inside wall of the valve body around the relief port 24 as shown in FIGS. 3 and 3A, and an inner end coil of the spring is seated against a radial, annular face 36a of the stop disk 36.

The spring constant of the biasing spring 46 is chosen so that the biasing force thereof urging the valve mechanism to a port closing position as shown in FIG. 3 will be overcome at a selected safe pressure level (i.e., 100 psi) and at pressures above the selected safe level, the valve disk 32 will be moved outwardly from the closed position in the direction of arrow A (FIG. 3A) to permit the relief venting of the high pressure air from the interior of the valve body as indicated by the arrows B. This venting action prevents excessive and unsafe air pressure from building up in the valve body and reaching the hollow handle 14 of the tool 10. The noise created by the venting action alerts the tool operator of the over pressure condition so that a quick disconnect can be accomplished.

Whenever the air pressure source connected to the relief valve 20 returns to a pressure that is at or below the selected safe pressure level, the biasing force of the spring 46 is again effective to close the valve disk 32 in the relief port 24 and when this occurs, the circular stop surface 36b on the stop disk 36 of the valve assembly 30 again engages the stop surface 44 of the stop member 40 as shown in FIG. 3. The valve assembly 30 is effective to automatically reset after an over pressure is corrected so that continued operation of the tool 10 is possible immediately whenever the pressure supply drops to or below a selected safe pressure level.

The valve disk 32 is formed with an annular groove 32a in the peripheral edge and a resilient "O" ring 48 is seated in the groove to provide a tight seal between the closed valve disk 32 and the adjacent surface of the relief vent port 24. In order to insure this tight sealing engagement, a groove surface inwardly of the "O" ring 48 is vented to the external atmosphere by a venting passage 50 opening onto an outer surface of the valve disk 32 and having a blind inner end in communication with a radial passage 52 connected to the groove 32a inside of the "O" ring 48. This arrangement assures that the "O" ring tightly seals between adjacent facing surfaces of the valve body and the valve disk.

The relief valve 20 is automatically reset whenever the air pressure within the interior bore 22 of the valve body goes down below a desired maximum safe operating pressure for the tool and for safety protection whenever the air pressure as supplied to the valve 20 reaches a level above the desired maximum safe operating level, the excess air pressure or over pressure is vented to the atmosphere through the relief port vent 24 (FIG. 3A). By thee means, excessive over pressure is precluded from reaching the interior of the internal reservoir or handle 14 of the tool 10. The relief valve 20 is small in size and light in weight and does not interfere with the handling or manipulation of the tool. The valve can be readily disconnected and replaced if desired, and the internal valve assembly 30 or spring 46 can be readily inserted and/or removed and replaced by simply removing the threaded stop member 40 and withdrawing the valve assembly outwardly along an axis transverse to the body of the valve.

Referring now momentarily to FIG. 6, therein is illustrated a relatively large size pneumatic tool 10A having a large hollow reservoir with a threaded aperture 14a in an outer wall thereof. This aperture is fitted with a replaceable, threaded, annular bushing 54 having a threaded interior bore 54a sized to match the male threaded end segment 20a of the relief valve 20. Accordingly, both a large tool 10A or a small tool 10 can be easily accommodated with the same relief valve 20 to provide a safety system for protecting both persons and the environment around these pneumatic tools from possible damage resulting from the inadvertent connection to a source of compressed air at a dangerously high pressure level.

Although the present invention has been described in connection with details of the preferred embodiment, many alterations and modifications may be made without departing from the invention. Accordingly, it is intended that all such alterations and modifications be considered within the spirit and scope of the invention as defined in the appended claims.

What is claimed is:

1. In combination, a pneumatic tool and a resettable safety valve for preventing over pressure in said tool should said tool be supplied with compressed air above a predetermined safe pressure level; said safety valve comprising a valve body having an outlet adapted to be connected to a supply inlet for said tool and an inlet adapted to be connected to source of compressed air, a relief port in said body for discharging excessive air pressure, a valve member movable in said body to open and close said port, said inlet and outlet positioned in said valve body to communicate with said relief port when said valve member is in a position to open said port to vent said over pressure from said tool said body including an access opening opposite said relief port, and stop means in said access opening for limiting the travel of said valve member, said valve member comprising an elongated stem, a valve disk adjacent an outer end of said stem for opening and closing said relief port and a stop disk at an inner end of said stem for engaging said stop means positioned in said access opening; and biasing means for moving said valve member to close said port whenever the air pressure in said body is below said safe pressure level.

2. The combination of claim 1, wherein:
said biasing means comprises annular spring means mounted on said stem having an outer end engaging said body around said relief port and an inner end engaging said stop disk for biasing the same toward said stop means.

3. The combination of claim 2, wherein:
said access opening is larger in diameter than said stop disk and said valve disk for permitting insertion and removal of said valve member and biasing means into and out of said body through said access opening.

4. The combination of claim 2, wherein:
said stop disk has a diameter greater than an inside diameter of said annular spring means which diameter is greater than the diameter of said relief port.

5. The combination of claim 2, wherein:
said valve disk includes an annular inside face around said stem exposed to the interior of said body and having a diameter less than an inside diameter of said annular spring means.

6. The combination of claim 1, wherein:
said valve disk is formed with an annular groove around a peripheral edge, and includes a resilient O-ring seated in said groove for sealing engagement with said relief port when said valve member is in a closed position.

7. The combination of claim 6, wherein:
said valve disk is formed with an air bleed passage extending between an interior portion of said groove and an exterior face of said valve disk in communication with the atmosphere.

8. The combination of claim 1, wherein:

said body includes connector means at opposite ends for interconnection with said tool and a source of compressed air, respectively, and wherein said access opening and relief port are in coaxial alignment on opposite sides of said body between said connector means at said opposite ends.

9. A safety valve for interconnection between a pneumatic tool and a source of compressed air for operating said tool, comprising:

a hollow body having connectors at opposite ends adapted for connection to said tool and to said source of compressed air, respectively;

said hollow body including an access opening and a coaxially aligned relief port on opposite sides spaced between said connectors;

a valve member insertable into said hollow body through said access opening along a central axis thereof extending transversely across a longitudinal axis of said body extending between said connectors, said valve member including a valve disk at one end adapted to open and close said relief port, a stop disk at an opposite end and a stem interconnected between said disks;

a stop member normally closing said access opening and including a stop surface engageable with said stop disk for limiting the travel of said valve disk along said central axis inwardly of said relief port; and a biasing member on said stem engaged between said stop disk and an interior surface of said body around said relief port for normally biasing said valve disk to close said relief port until internal air pressure in said body acting against said biasing means reaches a predetermined maximum level, sufficient to open said valve disk outwardly of said relief port.

10. The safety valve of claim 9, wherein:
said stop disk has a diameter less than that of said access opening and greater than that of said relief port.

11. The safety valve of claim 10, wherein:
said biasing member comprises coil spring means in coaxial alignment on said stem having an inner end biasing said stop disk toward said stop member and an opposite end engaging said interior surface of said body around said relief port.

12. The safety valve of claim 9, wherein:
said valve disk is formed with an annular groove around a peripheral surface thereon directly facing a seat surface of said relief port of said body when said valve member is in a closed position; and resilient "O" ring means seated in said groove and having an outer surface sealingly engaged against said seat surface of said relief port.

13. The safety valve of claim 12, wherein:
said valve member includes a vent passage in communication between an interior surface of said groove in said valve disk and the atmosphere outside of said safety valve for enabling internal air pressure in said valve body to seat said "O" ring tightly in said groove.

14. A safety system for automatically preventing over pressure in the interior of a pneumatically operated device supplied from a source of compressed air, said device having connector means for directing compressed air from said source into the interior thereof, said safety system including a relief valve interconnected between said connector means and said source, said relief valve including a housing having a relief port and a resettable valve member mounted in said housing and movable to open and close said relief port in response to the level of air pressure supplied from said source, said housing including an inlet for communication with said source of compressed air and an outlet for supplying compressed air to the interior of said device for operation thereof, said outlet being positioned to vent over pressure from said device interior to said relief port when said valve member is in a position to open said relief port, said housing further including an access opening opposite said valve member and a removable stop member normally closing said access port and limiting the movement of said valve member in a direction inwardly of said housing, said access opening being dimensioned large enough to permit the insertion and removal of said valve member in said housing, and biasing means for maintaining said valve member in engagement with said stop member until an over pressure is encountered in said housing.

15. The safety system of claim 14, wherein:
said device comprises a pneumatic tool having an interior reservoir for holding a quantity of compressed air for operating said tool supplied from said source; and said connector means is in direct communication with said reservoir; and wherein said safety relief valve includes detachable connectors for connecting said housing to said connector means of said tool and said source of compressed air.

16. The system of claim 15, wherein:
said connector means comprises a threaded aperture in said reservoir of said tool and one of said connectors of said relief valve comprises a threaded end portion for direct threaded engagement in said aperture.

17. The system of claim 15, wherein:
said connector means comprises a replaceable bushing in threaded engagement with a threaded aperture in said reservoir of said tool and wherein one of said connectors of said relief valve comprises a threaded end portion for direct engagement with said bushing.

18. The system of claim 15, wherein:
said safety system includes quick disconnect means between said relief valve and said source of compressed air.

19. In combination, a pneumatic tool and a resettable safety valve for preventing over pressure in said tool should said tool be supplied with compressed air above a predetermined safe pressure level; said safety valve comprising a valve body adapted to be connected between said tool and a source of compressed air, a relief port in said body for discharging excessive air pressure, an access opening opposite said relief port, a valve member movable in said body to open and close said port, stop means for limiting the travel of said valve member, said valve member comprising an elongated stem, a valve disk adjacent a outer end of said stem for opening and closing said relief port and a stop disk at an inner end of said stem for engaging said stop means, and biasing means for moving said valve member to close said port whenever the air pressure in said body is below said safe pressure level, said biasing means comprising annular spring means mounted on said stem having an outer end engaging said body around said relief port and an inner end engaging said stop disk for biasing the same toward said stop means.

20. The combination of claim 19, wherein:
said access opening is larger in diameter than said stop disk and said valve disk for permitting insertion and removal of said valve member and biasing means into and out of said body through said access opening.

21. The combination of claim 19, wherein:
said stop disk has a diameter greater than an inside diameter of said annular spring means which diameter is greater than the diameter of said relief port.

22. The combination of claim 19, wherein:
said valve disk includes an annular inside face around said stem exposed to the interior of said body and spaced inwardly of said biasing means.

23. The combination of claim 19, wherein:
said valve disk is formed with an annular groove around a peripheral edge, and includes a resilient O-ring seated in said groove for sealing engagement with said relief port when said valve member is in a closed position.

24. The combination of claim 23, wherein:
said valve disk is formed with an air bleed passage extending between an interior portion of said groove and an exterior face of said valve disk in communication with the atmosphere.

25. The combination of claim 19, wherein:
said body includes connector means at opposite ends for interconnection with said tool and a source of compressed air, respectively, and wherein
said access opening and relief port are in coaxial alignment on opposite sides of said body between said connector means at said opposite ends.

* * * * *